(12) United States Patent
Takeda

(10) Patent No.: US 11,476,536 B2
(45) Date of Patent: Oct. 18, 2022

(54) BATTERY HOUSING

(71) Applicant: Daimler AG, Stuttgart (DE)

(72) Inventor: Shogo Takeda, Kanagawa (JP)

(73) Assignee: Daimler AG, Stuttgart (DE)

( * ) Notice: Subject to any disclaimer, the term of this patent is extended or adjusted under 35 U.S.C. 154(b) by 141 days.

(21) Appl. No.: 16/954,087

(22) PCT Filed: Oct. 25, 2018

(86) PCT No.: PCT/JP2018/039616
§ 371 (c)(1),
(2) Date: Jun. 15, 2020

(87) PCT Pub. No.: WO2019/123824
PCT Pub. Date: Jun. 27, 2019

(65) Prior Publication Data
US 2021/0194089 A1   Jun. 24, 2021

(30) Foreign Application Priority Data

Dec. 19, 2017  (JP) .............................. JP2017-242926

(51) Int. Cl.
*B60K 11/06*  (2006.01)
*H01M 50/249*  (2021.01)
*H01M 50/244*  (2021.01)
*B60K 1/04*  (2019.01)

(52) U.S. Cl.
CPC ............ *H01M 50/249* (2021.01); *B60K 1/04* (2013.01); *B60K 11/06* (2013.01); *H01M 50/244* (2021.01); *B60K 2001/0411* (2013.01); *H01M 2220/20* (2013.01)

(58) Field of Classification Search
CPC .. B60K 1/04; B60K 2001/0411; B60K 11/06; H01M 2220/20
See application file for complete search history.

(56) References Cited

U.S. PATENT DOCUMENTS

| 4,793,293 A * | 12/1988 | Minami ................. F02B 61/02 123/41.7 |
| 2013/0233634 A1 | 9/2013 | Matsuda |
| 2013/0270940 A1 | 10/2013 | Matsuda |

(Continued)

FOREIGN PATENT DOCUMENTS

| CN | 103707776 A | 4/2014 |
| EP | 2 712 770 A2 | 4/2014 |

(Continued)

OTHER PUBLICATIONS

PCT/JP2018/039616, International Search Report dated Jan. 29, 2019 (Two (2) pages).

(Continued)

*Primary Examiner* — Jonathan Ng
*Assistant Examiner* — James J Triggs
(74) *Attorney, Agent, or Firm* — Crowell & Moring LLP

(57) ABSTRACT

A battery housing is arranged at a vehicle-longitudinal front side of a drive apparatus which transmits drive power to a rear axle of a vehicle. The battery housing encloses a battery for supplying electricity to the drive apparatus. The battery housing has an exterior surface including an air guide surface configured to guide airflow produced by the moving vehicle to the drive apparatus.

15 Claims, 6 Drawing Sheets

(56) References Cited

U.S. PATENT DOCUMENTS

2014/0091761 A1    4/2014  Uchida et al.
2014/0367184 A1*  12/2014  Matsuda ................ B60L 15/20
                                                             180/220

FOREIGN PATENT DOCUMENTS

| JP | 3-63064 U | 6/1991 |
| JP | 2008-195259 A | 8/2008 |
| JP | 2014-69687 A | 4/2014 |
| JP | 2016-107652 A | 6/2016 |
| JP | 2018-131043 A | 8/2018 |
| WO | WO 2014/148410 A1 | 9/2014 |

OTHER PUBLICATIONS

English-language European Office Action issued in European application No. 18 892 097.9-1012 dated Feb. 24, 2022 (Six (6) pages).

* cited by examiner

BATTERY HOUSING

TECHNICAL FIELD

The present invention relates to a battery housing enclosing a battery of an electric vehicle.

BACKGROUND ART

Electric vehicles using a motor as a propulsion source commonly comprise a drive apparatus including the motor and a speed reducing mechanism including a plurality of gears, wherein drive power is transmitted from the motor to drive wheels via the drive apparatus and a differential gear. For example, Patent Document 1 discloses a drive apparatus which propels a front-wheel drive electric vehicle by deriving electricity from an on-board battery.

In recent years, in order to reduce environmental burdens, development of electric vehicles not having an internal combustion engine has been progressing not only in a division of passenger vehicles but also in a field of medium- and large-size vehicles such as trucks. For example, electric trucks not having an internal combustion engine but propelled by a drive apparatus as mentioned above using only electricity from a battery are attracting attention.

CITATION LIST

Patent Document

[Patent Document 1] International Publication No. 2014/148410

SUMMARY OF THE INVENTION

Problem to be Solved by the Invention

Because of their vehicle weight and demanded travel range, electric trucks require that a large-size and large-capacity traction battery as compared with passenger vehicles be mounted. However, in rear-wheel drive electric trucks in which a large traction battery is arranged to a vehicle-longitudinal front side of a drive apparatus that drives a rear wheel shaft, a sufficient space may not be left around the drive apparatus which heats during operation, leading to a reduced effect of cooling the drive apparatus.

The present invention has been made in view of the above problem. An object of the present invention is to provide a battery housing which can ensure the effect of cooling the drive apparatus.

Arrangement for Solving the Problem

First Aspect of the Invention

A first aspect of the present invention is a battery housing arranged to a vehicle-longitudinal front side of a drive apparatus which transmits drive power to a rear wheel shaft of a vehicle, to enclose a battery for supplying electricity to the drive apparatus, wherein the battery housing has an exterior surface including an air guide surface adapted to guide airflow produced by the moving vehicle to the drive apparatus.

The vehicle is propelled by the drive apparatus which transmits drive power to the rear wheel shaft by being supplied with electricity from the battery. When arranged to the vehicle-longitudinal front side of the drive apparatus, the battery housing enclosing the battery is allowed to occupy a relatively large space in the vehicle. This makes it possible to increase the vehicle's travel range, but narrows a space around the drive apparatus. The battery housing has, however, an exterior surface including an air guide surface adapted to guide airflow, produced by the moving vehicle, to the drive apparatus. The battery housing can therefore guide airflow produced by the moving vehicle to the drive apparatus, thereby air-cooling the drive apparatus. The first aspect of the present invention can thus ensure the effect of cooling the drive apparatus.

Second Aspect of the Invention

A second aspect of the present invention is a battery housing arranged to a vehicle-longitudinal front side of a drive apparatus which transmits drive power to a rear wheel shaft of a vehicle, to enclose a battery for supplying electricity to the drive apparatus, wherein the battery housing has an exterior surface including an air guide surface adapted to have a tangential plane crossing the drive apparatus.

The vehicle is propelled by the drive apparatus which transmits drive power to the rear wheel shaft by being supplied with electricity from the battery. When arranged to the vehicle-longitudinal front side of the drive apparatus, the battery housing enclosing the battery is allowed to occupy a relatively large space in the vehicle. This makes it possible to increase the vehicle's travel range, but narrows a space around the drive apparatus. The battery housing has, however, an exterior surface including an air guide surface adapted to have a tangential plane crossing the drive apparatus. The battery housing can therefore guide airflow produced by the moving vehicle to the drive apparatus, thereby air-cooling the drive apparatus. The second aspect of the present invention can thus ensure the effect of cooling the drive apparatus.

Third Aspect of the Invention

A third aspect of the present invention is a battery housing arranged to a vehicle-longitudinal front side of a drive apparatus which transmits drive power to a rear wheel shaft of a vehicle, to enclose a battery for supplying electricity to the drive apparatus, wherein the battery housing has an exterior surface including an air guide surface adapted to have a tangential plane crossing the drive apparatus to guide airflow produced by the moving vehicle to the drive apparatus.

The vehicle is propelled by the drive apparatus which transmits drive power to the rear wheel shaft by being supplied with electricity from the battery. When arranged to the vehicle-longitudinal front side of the drive apparatus, the battery housing enclosing the battery is allowed to occupy a relatively large space in the vehicle. This makes it possible to increase the vehicle's travel range, but narrows a space around the drive apparatus. The battery housing has, however, an exterior surface including an air guide surface adapted to guide airflow, produced by the moving vehicle, to the drive apparatus. The battery housing can therefore guide airflow produced by the moving vehicle to the drive apparatus, thereby air-cooling the drive apparatus. The third aspect of the present invention can thus ensure the effect of cooling the drive apparatus.

Fourth Aspect of the Invention

A fourth aspect of the present invention is a battery housing according to any of the first to third aspects, wherein the air guide surface is provided to at least one surface selected from a vehicle height-wise bottom surface and two vehicle widthwise-separated side surfaces of the battery housing.

When the battery housing enclosing the battery is arranged to the vehicle-longitudinal front side of the drive apparatus, airflow produced near the battery housing mostly moves along the vehicle height-wise bottom surface and the vehicle widthwise-separated side surfaces of the battery housing. Here, the air guide surface is provided to at least one of these surfaces. The fourth aspect of the present invention can thus provide the same effect as the first aspect provides, and that more reliably.

Fifth Aspect of the Invention

A fifth aspect of the present invention is a battery housing according to any of the first to fourth aspects, wherein the air guide surface incloses a flat surface or a curved surface.

In the firth aspect, the air guide surface has a relatively simple shape including a flat or curved surface. Accordingly, the battery housing can be formed relatively easily, for example by pressing. The fifth aspect of the present invention can thus provide an increased efficiency of producing the battery housing, in addition to the same effect as the first aspect provides.

Sixth Aspect of the Invention

A sixth aspect of the present invention is a battery housing according to any of the first to fifth aspects, wherein the battery housing has the air guide surface in a vehicle-longitudinal rear end portion.

In the sixth aspect, the battery housing has the air guide surface in a vehicle-longitudinal rear end portion. This can minimize a reduction in space for the battery within the battery housing, while ensuring that the air guide surface guides airflow to the drive apparatus arranged to the vehicle-longitudinal rear side of the battery housing.

Seventh Aspect of the Invention

A seventh aspect of the present invention is a battery housing according to any of the first to sixth aspects, wherein the air guide surface includes at least a first air guide surface and a second air guide surface, the first and second air guide surfaces each being a flat surface or a curved surface.

In the seventh aspect, the air guide surface of the battery housing includes a plurality of air guide surface segments including at least a first air guide surface and a second air guide surface, where each air guide surface segment is a relatively simple-shaped flat or curved surface. The seventh aspect of the present invention has an advantage that various shapes can be given to the air guide surface by varying the inclinations of the first and second air guide surfaces.

Eighth Aspect of the Invention

An eighth aspect of the present invention is a battery housing according to any of the first to seventh aspects, wherein the air guide surface forms an obtuse internal angle with an adjacent surface of the battery housing.

The eighth aspect can reduce the resistance which the airflow moving along the exterior surface of the battery housing experiences when changing the direction to follow the air guide surface, thereby enhancing the effect of cooling the drive apparatus.

Ninth Aspect of the Invention

A ninth aspect of the present invention is a battery housing according to any of the first to eighth aspects, wherein the air guide surface forms an external angle less than 450 with an adjacent surface of the battery housing.

The ninth aspect can make the airflow moving along the exterior surface of the battery housing unlikely to separate from the air guide surface when changing the direction, thus making it easy for the airflow to follow the inclined air guide surface. The ninth aspect has thus an advantage that the air guide surface of the battery housing can guide the airflow to the drive apparatus with enhanced reliability.

Tenth Aspect of the Invention

A tenth aspect of the present invention is a battery housing according to the first aspect, wherein at least one surface selected from a vehicle height-wise bottom surface and two vehicle widthwise-separated side surfaces of the battery housing forms the air guide surface in its entirety.

In the tenth aspect, at least one surface selected from the vehicle height-wise bottom surface and the vehicle widthwise-separated side surfaces of the battery housing forms the air guide surface in its entirety. The tenth aspect of the present invention can thus guide a greater amount of air flowing near the battery housing to the drive apparatus, thereby enhancing the effect of cooling the drive apparatus.

MODE OF CARRYING OUT THE INVENTION

With reference to the accompanying drawings, embodiments of the present invention will be described in detail. The present invention is not limited to the description given below; it can be carried out with any desired alteration that does not change the essentials thereof. The drawings used in explanation of the embodiments show components, schematically; in order to help understanding, they may contain partial emphasis, enlargement, contraction, omission or the like, and thus, may not necessarily show the components on an accurate scale and in an accurate shape.

First Embodiment

Figure 1:
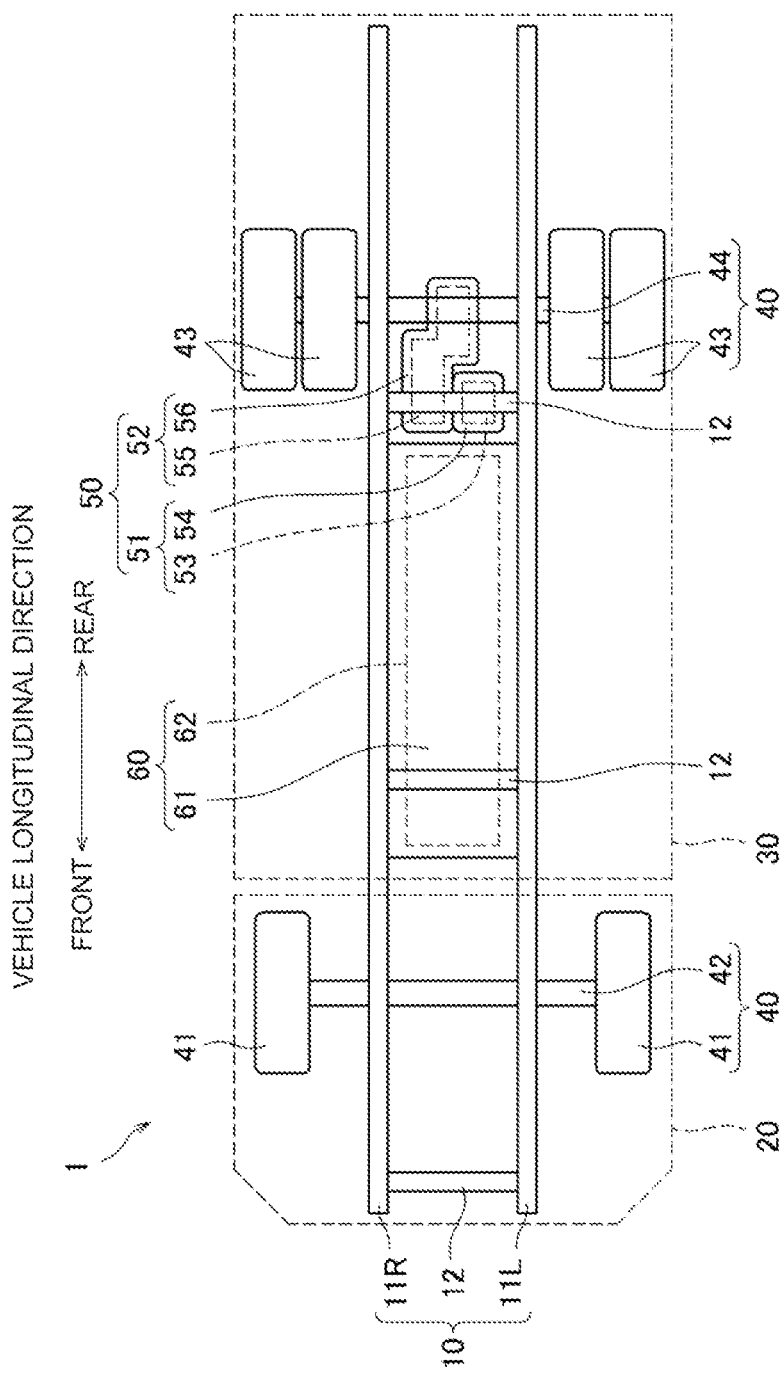
FIG. 1 is a top view showing a schematic configuration of a vehicle having a battery housing according to a first embodiment of the present invention.

FIG. 1 is a top view showing a schematic configuration of a vehicle 1 having a battery housing according to a first embodiment of the present invention. The vehicle 1 is a so-called EV truck comprising a frame 10, a cab 20, a cargo box 30, a wheel mechanism 40, a drive apparatus 50 and a battery unit 60. FIG. 1 represents the frame, etc. seen from the top of the vehicle 1 through the cab 20 and the cargo box 30.

The frame 10 includes a left side rail 11L, a right side rail 11R and a plurality of cross members 12. The left side rail 11L and the right side rail 11R run longitudinally of the vehicle 1. They are vehicle-widthwise separated from each other and parallel to each other. The cross members 12 connect the left side rail 11L and the right side rail 11R, thereby forming a ladder frame 10. The frame 10 supports the cab 20, the cargo box 30, the drive apparatus 50, the battery unit 60 and other heavy objects mounted on the vehicle 1.

The cab 20 is a structure with a driver's seat, not shown, and arranged over a front part of the frame 10, The cargo box 30 is a structure into which cargo is loaded, and arranged over a rear part of the frame 10.

In the present example, the wheel mechanism 40 includes left and right front wheels 41, a front axle 42, or shaft for the front wheels 41, rear wheels 43, specifically two left rear wheels and two right rear wheels, and a rear axle 44, referred to also as "rear wheel shaft", wherein the rear wheels 43 are drive wheels to which drive power is transmitted to move the vehicle 1. The wheel mechanism 40 is connected to the frame 10 by a suspension mechanism, not shown, and supports the weight of the vehicle 1.

The drive apparatus 50 comprises a motor unit 51 and a gear unit 52. The motor unit 51 comprises a motor 53 and a motor housing 54 enclosing the motor 53. The gear unit 52 comprises a speed reducing mechanism 55 including a plurality of gears, and a gear housing 56 enclosing the speed reducing mechanism 55. The drive apparatus 55 transmits torque from the motor 53 to the rear axle 44, wherein the speed reducing mechanism 55 reduces the revolution speed to a level suited for moving the vehicle. The drive apparatus 50 can thus rotate the rear wheels 43 via the rear axle 44, thereby moving the vehicle 1. In the present example, the drive apparatus 50 is arranged in a vehicle-widthwise central region between the left side rail 11L and the right side rail 11R and held against the frame 10 by support members, not shown.

The battery unit 60 comprises a battery 61, which is an energy source that delivers electricity to the motor 53 to move the vehicle 1, and a battery housing 62 enclosing the battery 61. The battery unit 61 is a secondary battery with a relatively large size and a large capacity, and stores electricity required for the vehicle 1, or electric truck. In the present example, the battery unit 60 is arranged in the vehicle-widthwise central region between the left side rail 11L and the right side rail 11R and to the vehicle front side of the drive apparatus 50. A drive system comprising the drive apparatus 50 and the battery unit 60 functions as a drive apparatus cooling mechanism.

Figure 2:
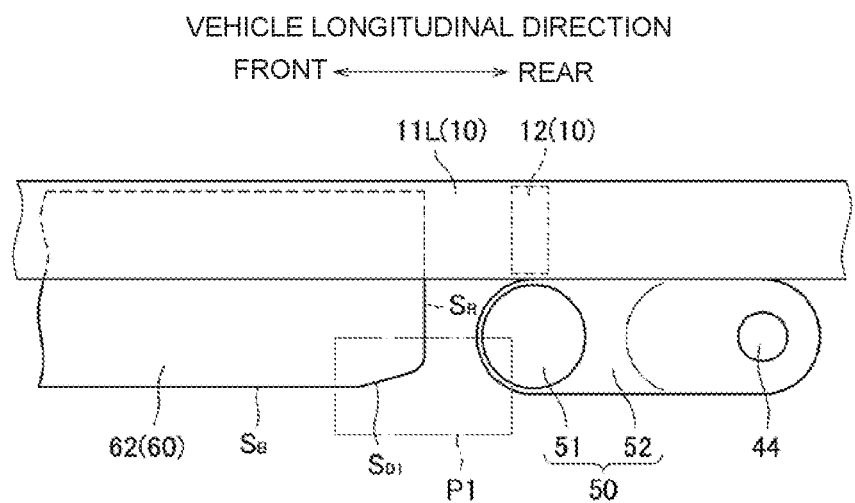
FIG. 2 is a side view showing a drive apparatus and a vehicle-longitudinal rear portion of the battery housing according to the first embodiment.

FIG. 2 is a side view showing part of the drive apparatus 50 and a vehicle-longitudinal rear portion of the battery unit 60 according to the first embodiment of the present invention viewed from the left side of the vehicle 1, on an enlarged scale.

The drive unit 50 is held against one of the cross members 12 connecting the left side rail 11L and the right side rail 11R by support members, not shown, to be located under that cross member 12. The battery unit 60 according to the first embodiment is arranged to the vehicle-longitudinal front side of the drive unit 50, with its upper portion located between the is between to be located between the left side rail 11L and the right side rail 11R. Here, the bottom surface of the drive apparatus 50 and the bottom surface of the battery unit 60 are approximately at the same height giving a distance to the road surface allowable for the vehicle 1.

The exterior surface of the battery housing 60 according to the first embodiment includes a bottom surface $S_B$ which is approximately parallel to the road surface, a rear face $S_R$ which is approximately perpendicular to the vehicle longitudinal direction, and an air guide surface $S_{D1}$ provided at the vehicle-longitudinal rear end to guide airflow, produced by the moving vehicle, to the drive apparatus 50. The air guide surface $S_{D1}$ is provided as a chamfer between the bottom face $S_B$ and the rear face $S_R$ perpendicular to each other.

Figure 3:
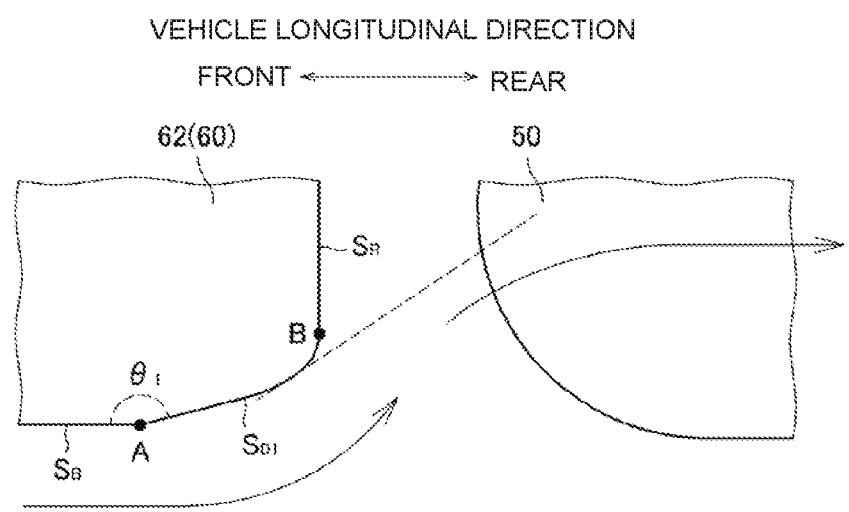
FIG. 3 is a side view showing a vehicle-longitudinal rear end portion of the battery housing according to the first embodiment.

FIG. 3 is a side view showing a vehicle-longitudinal rear end portion of the battery housing according to the first embodiment, specifically showing a part P1 of FIG. 2 on an enlarged scale. In FIG. 3, arrows indicate airflow produced by the moving vehicle 1. Point A indicates a joint between the bottom surface $S_B$ and the air guide surface $S_{D1}$ of the battery housing 62, and point B a joint between the air guide surface Si and the rear surface $S_R$ of the battery housing 62. In the first embodiment, the air guide surface $S_{D1}$ is designed to be curved and have a tangential plane crossing the drive apparatus 50 as indicated by a broken line.

As indicated in FIG. 3, under the vehicle 1, airflow from the vehicle-longitudinal front side, produced by the moving vehicle, moves immediately under the bottom surface $S_B$ of the battery housing 62, approximately parallel to the bottom surface $S_B$, then immediately under the air guide surface $S_{D1}$, changes the direction to follow the air guide surface $S_{D1}$, thereby being guided to the drive apparatus 50. Thus, although the battery unit 60 is arranged to the vehicle-longitudinal front side of the drive apparatus 50, the air guide face $S_{D1}$ can guide the airflow produced by the moving vehicle 1 to the drive apparatus 50, thereby ensuring the effect of cooling the drive apparatus 50 which heats during operation.

In the first embodiment, the air guide face $S_{D1}$ is curved in a manner maximizing the flow rate of air guided to the drive apparatus 50. Such flow rate-maximizing shape can be represented by a polynomial expression and determined, for example by measuring the flow rate of air in computer simulation with the vehicle speed set at a specified value. The battery housing 62 with the air guide surface $S_{D1}$ curved in a manner maximizing the flow rate of air guided to the drive apparatus can maximize the effect of cooling the drive apparatus 50 while minimizing a reduction in space for the battery 61 within the battery housing 62.

As indicated in FIG. 3, the internal angle $\theta_1$ between the bottom surface $S_B$ and the air guide surface $S_{D1}$ of the battery housing 62 jointed at point A is an obtuse angle. The air guide surface $S_{D1}$ joined to form such obtuse internal angle $\theta_1$ can reduce the resistance which the airflow moving immediately under the bottom surface $S_B$ experiences when changing the direction to follow the air guide surface $S_{D1}$, thereby enhancing the effect of cooling the drive apparatus 50. It is desirable that the internal angle $\theta_1$ between the bottom surface $S_B$ and the air guide surface $S_{D1}$ joined at point A be close to 180°.

In the battery housing 62, the air guide surface $S_{D1}$ may be curved in the form of a round surface. Since the round surface is simple as compared with the flow-rate maximizing shape, the air guide surface $S_{D1}$ curved in the form of a round surface can be formed by pressing easily, leading to an increased efficiency of producing the battery housing 62.

In the first embodiment, the effect of cooling the drive apparatus 50 is ensured by the shape of the exterior surface of the battery housing 62 including the air guide surface $S_{D1}$, which means that various advantages as mentioned above can be obtained without an increase in the number of components and production costs.

Second Embodiment

Next, a second embodiment of the present invention will be described. The battery housing according to the second embodiment is different in the shape of the air guide surface than the first embodiment. The following description will focus on the difference from the first embodiment. The features common to the first and second embodiments are given the same reference signs and the detailed description thereof will be omitted.

Figure 4:
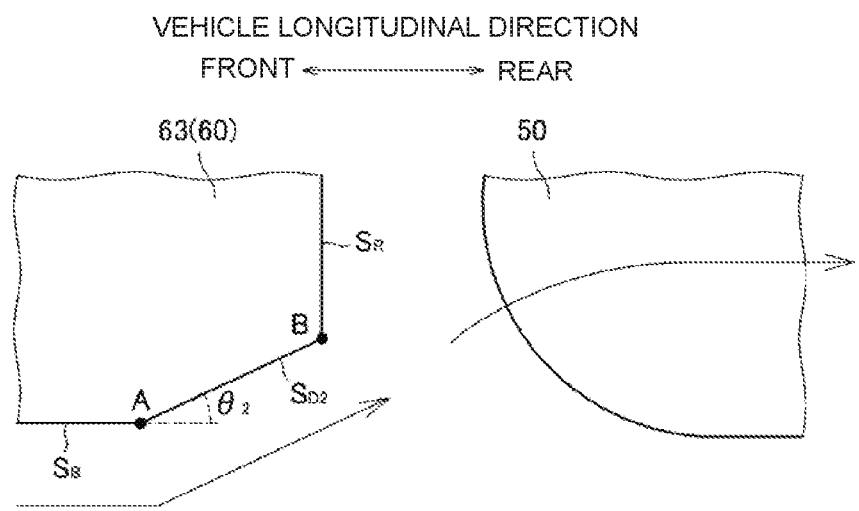
FIG. 4 is a side view showing a vehicle-longitudinal rear end portion of a battery housing according to a second embodiment of the present invention.

FIG. 4 is a side view showing a vehicle-longitudinal rear end portion of a battery housing 63 according to the second embodiment. In the battery housing 63 shown in FIG. 4, the air guide surface $S_{D2}$ consists of a flat surface.

As in the first embodiment, in the battery housing 63 according to the second embodiment, the air guide surface $S_{D2}$ can guide airflow, produced by the moving vehicle and moving immediately under the bottom surface $S_B$, to the drive apparatus 50, thereby ensuring the effect of cooling the drive apparatus 50 which heats during operation. In the battery housing 63 according to the second embodiment, the air guide surface $S_{D2}$ consisting of a flat surface can be formed by pressing easily, leading to an increased efficiency of producing the battery housing 63.

Here, it is desirable that the external angle $\theta_2$ between the bottom surface $S_B$ and the air guide surface $S_{D2}$ of the battery housing 63 joined at point A be less than 45°. The external angle $\theta_2$ less than 45° can make the airflow moving immediately under the bottom surface $S_{D2}$ unlikely to separate from the air guide surface $S_{B2}$, thus making it easy for the airflow to follow the inclined air guide surface $S_{D2}$. The air guide surface $S_{D2}$ of the battery housing 63 can thus guide the airflow to the drive apparatus 50 with an increased reliability. The air guide surface $S_{D2}$ in the second embodiment corresponds to the tangential plane to the air guide surface $S_{D1}$, wherein the external angle $\theta_2$ is determined to ensure that an extension of the air guide surface $S_{D2}$ crosses the drive apparatus 50.

Third Embodiment

Next, a third embodiment of the present invention will be described. The battery housing according to the third embodiment is different in the shape of the air guide surface than the first embodiment. The following description will focus on the difference from the first embodiment. The features common to the first and third embodiments are given the same reference signs and the detailed description thereof will be omitted.

Figure 5:
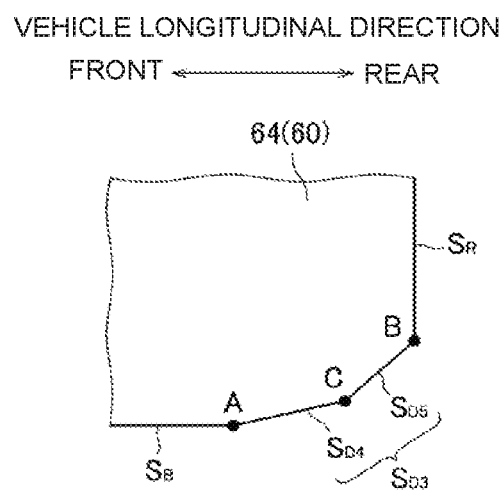
FIG. 5 is a side view showing a vehicle-longitudinal rear end portion of a battery housing according to a third embodiment of the present invention.

FIG. 5 is a side view showing a vehicle-longitudinal rear end portion of a battery housing 64 according to the third embodiment. In the battery housing 64 shown in FIG. 5, the air guide surface $S_{D3}$ consists of an air guide surface segment $S_{D4}$ referred to as "first air guide surface" and an air guide surface segment $S_{D5}$ referred to as "second air guide surface". The air guide surface segments $S_{D4}$ and $S_{D5}$ are flat surfaces and joined at point C in FIG. 5.

As in the first embodiment, in the battery housing 63 according to the third embodiment, the air guide surface $S_{D3}$ can guide airflow, produced by the moving vehicle and moving immediately under the bottom surface $S_B$, to the drive apparatus 50, thereby ensuring the effect of cooling the drive apparatus 50 which heats during operation. In the battery housing 64 according to the third embodiment, the air guide surface segments $S_{D4}$, $S_{D5}$, which are flat surfaces, can be formed by pressing easily, leading to an increased efficiency of producing the battery housing 64. Further, in the battery housing 64 according to the third embodiment, various shapes can be given to the air guide surface $S_{D3}$ by varying the inclinations of the air guide surface segments $S_{D4}$ and $S_{D5}$. Although the shown battery housing 64 has two air guide surface segments, the number of air guide surface segments is not limited to two. The battery housing may have a continuous series of a desired number of air guide surface segments.

Fourth Embodiment

Next, a fourth embodiment of the present invention will be described. The battery housing according to the fourth embodiment is different in the shape of the air guide surface than the third embodiment. The following description will focus on the difference from the third embodiment. The features common to the third and fourth embodiments are given the same reference signs and the detailed description thereof will be omitted.

Figure 6:
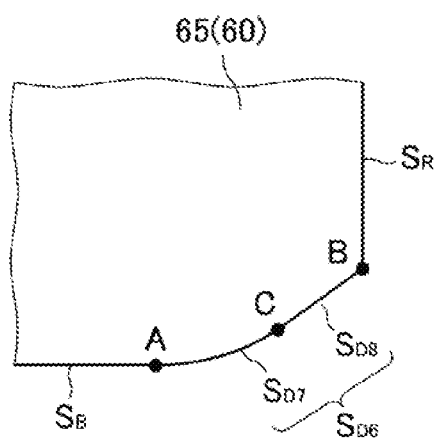
FIG. 6 is a side view showing a vehicle-longitudinal rear end portion of a battery housing according to a fourth embodiment of the present invention.

FIG. 6 is a side view showing a vehicle-longitudinal rear end portion of a battery housing 65 according to the fourth embodiment. In the battery housing 65 shown in FIG. 6, the air guide surface $S_{D6}$ consists of an air guide surface segment $S_{D7}$ and an air guide surface segment $S_{D8}$. The air guide surface segment $S_{D7}$ is a round surface and the air guide surface segment $S_{D8}$ is a flat surface. The air guide surface segments $S_{D7}$, and $S_{D8}$ are joined at point C in FIG. 6.

As in the third embodiment, in the battery housing 65 according to the fourth embodiment, the air guide surface $S_{D5}$ can guide airflow, produced by the moving vehicle and moving immediately under the bottom surface $S_B$, to the drive apparatus 50, thereby ensuring the effect of cooling the drive apparatus 50 which heats during operation. In the battery housing 65 according to the fourth embodiment, the air guide surface segments $S_{D7}$ and $S_{D8}$, which are a round surface and a flat surface, can be formed by pressing easily, leading to an increased efficiency of producing the battery housing 65. Further, in the battery housing 65 according to the fourth embodiment, various shapes can be given to the air guide surface $S_{D6}$ by varying the curvature of the air guide surface segment $S_{D7}$ and the inclination of the air guide surface segment $S_{D8}$. Although the shown battery housing 65 has two air guide surface segments, the number of air guide surface segments is not limited to two. The battery housing may have a continuous series of a desired number of air guide surface segments.

Fifth Embodiment

Next, a fifth embodiment of the present invention will be described. The battery housing according to the fifth embodiment is different in the location of the air guide surface than the first embodiment. The following description will focus on the difference from the first embodiment. The features common to the first and fifth embodiments are given the same reference signs and the detailed description thereof will be omitted.

Figure 7:
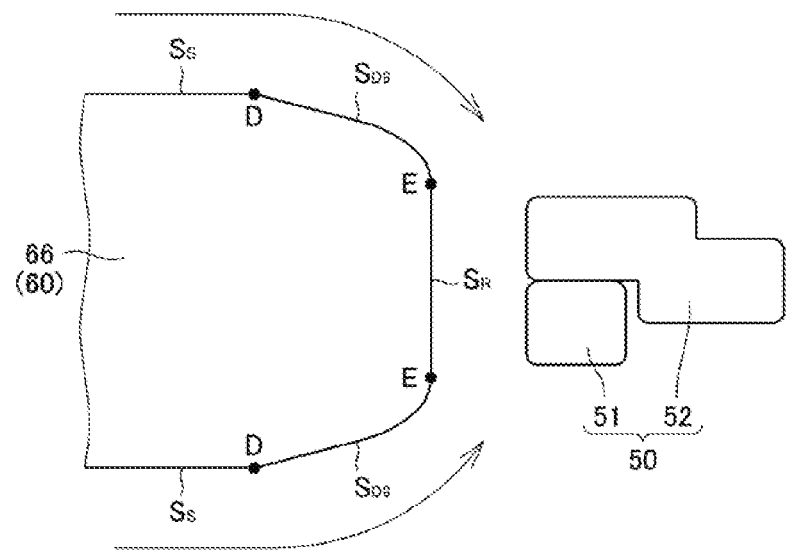
FIG. 7 is a top view showing a vehicle-longitudinal rear end portion of a battery housing according to a fifth embodiment of the present invention.

FIG. 7 is a top view showing a vehicle-longitudinal rear end portion of a battery housing 66 according to the fifth embodiment. In other words, FIG. 7 is a plan view showing a vehicle-longitudinal rear end portion of a battery unit 60 and a drive apparatus 50 viewed from the vehicle height-wise top.

The battery housing 66 have air guide surfaces $S_{D9}$ in a vehicle-longitudinal rear end portion, each being adjacent to one of two side surfaces $S_S$ which are vehicle-widthwise separated. Point D indicates a joint between the side surface $S_S$ and the air guide surface $S_{D9}$, and point E indicates a joint between the air-guide surface $S_{D9}$ and the rear surface $S_R$.

As indicated in FIG. 7, on each vehicle-widthwise outer side of the battery housing, airflow from the vehicle-longitudinal front side, produced by the moving vehicle, moves parallel to the side surface $S_S$, then changes the direction to follow the air guide surface $S_{D9}$, downstream of point D, thereby being guided to the drive apparatus 50. Thus, although the battery unit 60 is arranged to the vehicle-longitudinal front side of the drive apparatus 50, the air guide surfaces $S_{D9}$ can guide the airflow produced by the moving vehicle 1 to the drive apparatus 50, thereby ensuring the effect of cooling the drive apparatus which heats during operation. In place of the shape shown in FIG. 7, the air guide surface $S_{D9}$ may have any of the shapes which the air guide surfaces in the second to fourth embodiments have.

Sixth Embodiment

Next, a sixth embodiment of the present invention will be described. The battery housing according to the sixth embodiment is different in shape than the first embodiment. The following description will focus on the difference from the first embodiment. The features common to the first and sixth embodiments are given the same reference signs and the detailed description thereof will be omitted.

Figure 8:
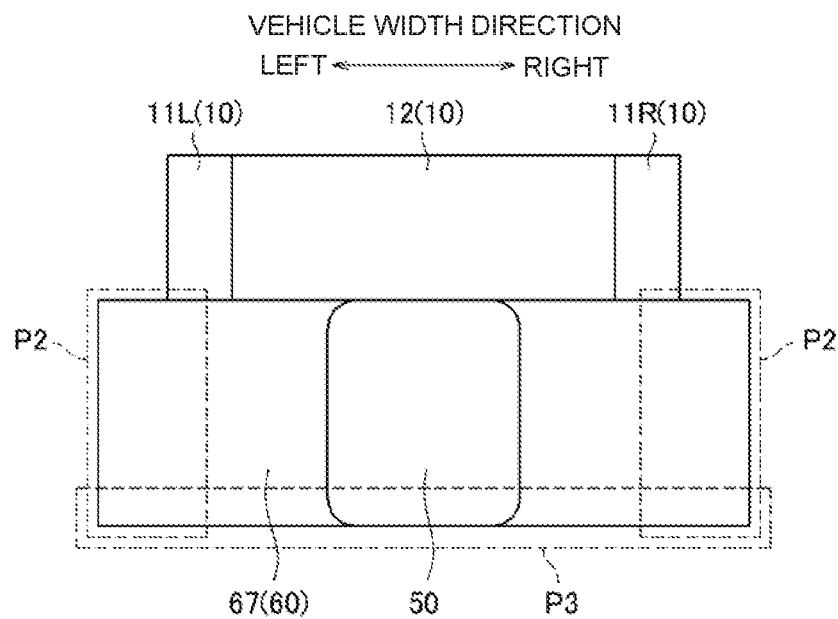
FIG. 8 is a rear view showing a drive apparatus and a battery unit according to a sixth embodiment of the present invention viewed from the vehicle rear side.

FIG. 8 is a rear view showing a drive apparatus 50 and a battery unit 60 according to the sixth embodiment viewed from the vehicle rear side. As seen in FIG. 8, the battery unit 60 according to the sixth embodiment has a vehicle-widthwise size greater than the width of the frame 10. With the top surface located under the vehicle height-wise bottom of the frame 10, the battery unit 60 is held against the left side rail 11L and the right side rail 11R by support members, not shown.

In the battery unit 60 of this shape, the battery housing 67 according to the sixth embodiment can have an air guide surface in a vehicle-longitudinal rear end portion, in at least one region selected from side regions P2 and a bottom region P3 indicated in FIG. 8, in a manner corresponding to any of the air guide surfaces in the first to fifth embodiments (although the air guide surface is not indicated in FIG. 8). The battery housing 67 according to the sixth embodiment can thus guide airflow, produced by the moving vehicle 1, to the drive apparatus 50, thereby ensuring the effect of cooling the drive apparatus 50 which heats during operation.

Seventh Embodiment

Next, a seventh embodiment of the present invention will be described. The battery housing according to the seventh embodiment is different in shape than the first embodiment. The following description will focus on the difference from the first embodiment. The features common to the first and seventh embodiments are given the same reference signs and the detailed description thereof will be omitted.

Figure 9:
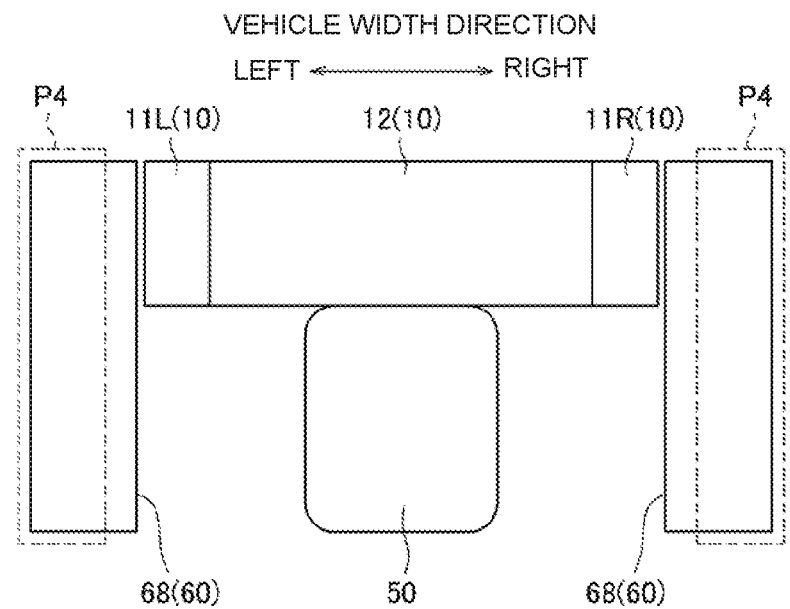
FIG. 9 is a rear view showing a drive apparatus and a battery unit according to a seventh embodiment of the invention viewed from the vehicle rear side.

FIG. 9 is a rear view showing a drive apparatus 50 and battery units 60 according to the seventh embodiment viewed from the vehicle rear side. As seen in FIG. 9, on the vehicle-widthwise outer side of the left side rail 11L, a battery unit 60 according to the seventh embodiment is held against the left side rail 11L by support members, not shown, and on the vehicle-widthwise outer side of the right side rail 11R, a battery unit 60 according to the seventh embodiment is held against the right side rail 11R by support members, not shown.

In the battery unit 60 of this shape, the battery housing 68 according to the seventh embodiment can have an air guide surface in a vehicle-longitudinal rear end portion, in a side region P4 indicated in FIG. 9, in a manner similar to that shown in FIG. 7 (although the air guide surface is not indicated in FIG. 9). The battery housing 68 according to the seventh embodiment can thus guide airflow, produced by the moving vehicle 1, to the drive apparatus 50, thereby ensuring the effect of cooling the drive apparatus 50 which heats during operation.

Eighth Embodiment

Next, an eighth embodiment of the present invention will be described. The battery housing according to the eighth embodiment is different in shape than the first embodiment. The following description will focus on the difference from the first embodiment. The features common to the first and eighth embodiments are given the same reference signs and the detailed description thereof will be omitted.

Figure 10:
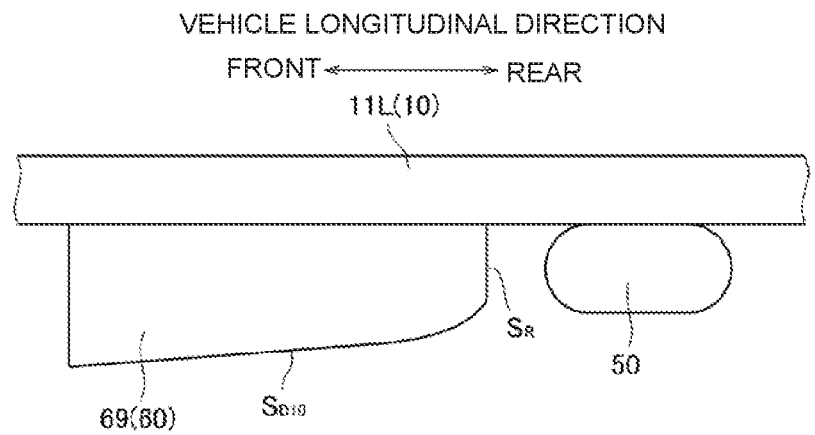
FIG. 10 is a side view showing a drive apparatus and a battery unit according to an eighth embodiment of the present invention.

FIG. 10 is a side view showing a drive apparatus 50 and a battery unit 60 according to the eighth embodiment. In the battery housing 69 according to the eighth embodiment shown in FIG. 10, the vehicle height-wise bottom surface forms an air guide surface $S_{D1}$ in its entirety. The shape of the air guide surface $S_{D1}$ may be similar to any of the shapes which the air guide surfaces in the first to fourth embodiments have.

For the same reason as given with regard to the first embodiment, the battery housing 69 according to the eighth embodiment can guide airflow, produced by the moving vehicle 1, to the drive apparatus 90, thereby ensuring the effect of cooling the drive apparatus 90 which heats during operation. Further, the battery housing 69 according to the eighth embodiment can guide a large amount of air to the drive apparatus 50 as compared with the first embodiment, which enhances the effect of cooling the drive apparatus 50.

Ninth Embodiment

Next, a ninth embodiment of the present invention will be described. The battery housing according to the ninth embodiment is different in the location of the air guide surface than the eighth embodiment. The following description will focus on the difference from the eighth embodiment. The features common to the eighth and ninth embodiments are given the same reference signs and the detailed description thereof will be omitted.

Figure 11:
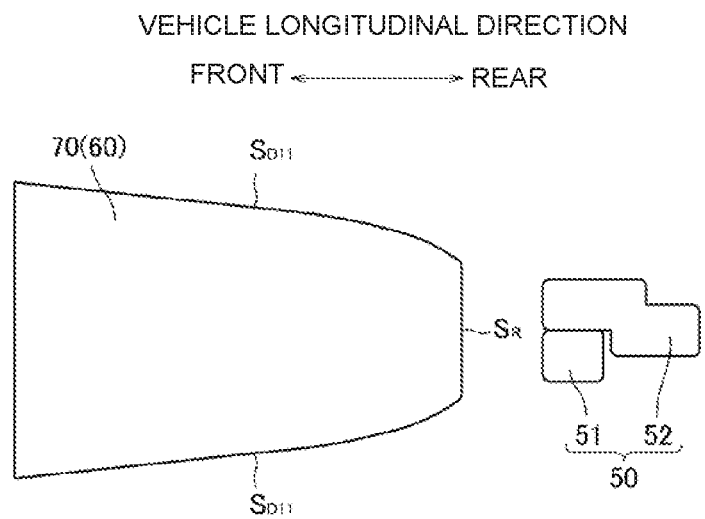
FIG. 11 is a top view showing a drive apparatus and a battery unit according to a ninth embodiment of the present invention.

FIG. 11 is a top view showing a drive apparatus 50 and a battery unit 60 according to the ninth embodiment. In the battery housing 70 according to the ninth embodiment shown in FIG. 11, two vehicle widthwise-separated side surfaces form air guide surfaces $S_{D11}$ in their entirety. The shape of the air guide surface $S_{D10}$ may be similar to any of the shapes which the air guide surfaces in the first to fourth embodiments have.

For the same reason as given with regard to the first embodiment, the battery housing 70 according to the ninth embodiment can guide airflow, produced by the moving vehicle 1, to the drive apparatus 90, thereby ensuring the effect of cooling the drive apparatus 50 which heats during operation. Further, like the eighth embodiment, the battery housing 70 according to the ninth embodiment can guide a larger amount of air to the drive apparatus 90, which enhances the effect of cooling the drive apparatus 50.

REFERENCE SIGNS LIST

1 Vehicle
10 Frame
11L Left side rail
11R Right side rail
12 Cross member
44 Rear axle
50 Drive apparatus
51 Motor unit
52 Gear unit
61 Battery
62 to 70 Battery housing
$S_{D1}$, to $S_{d3}$, $S_{D6}$, $S_{D9}$ to $S_{D11}$ Air guide surface

The invention claimed is:

1. An apparatus, comprising:
    battery housing arranged at a vehicle-longitudinal front side of a drive apparatus which transmits drive power to a rear wheel shaft of a vehicle, wherein the battery housing encloses a battery for supplying electricity to the drive apparatus;
    wherein the battery housing has an exterior surface including an air guide surface configured to guide airflow produced by the vehicle when moving to the drive apparatus and wherein the air guide surface forms an obtuse internal angle with an adjacent surface of the battery housing.

2. An apparatus, comprising:
    battery housing arranged at a vehicle-longitudinal front side of a drive apparatus which transmits drive power to a rear wheel shaft of a vehicle, wherein the battery housing encloses a battery for supplying electricity to the drive apparatus;
    wherein the battery housing has an exterior surface including an air guide surface configured to have a tangential plane crossing the drive apparatus and wherein the air guide surface forms an obtuse internal angle with an adjacent surface of the battery housing.

3. The apparatus according to claim 2, wherein the tangential plane crossing the drive apparatus guides airflow produced by the vehicle when moving to the drive apparatus.

4. The apparatus according to claim 1, wherein the air guide surface is provided on at least a vehicle height-wise bottom surface of the battery housing and/or a vehicle widthwise-side surface of the battery housing.

5. The apparatus according to claim 1, wherein the air guide surface includes a flat surface or a curved surface.

6. The apparatus according to claim 1, wherein the battery housing has the air guide surface in a vehicle-longitudinal rear end portion.

7. The apparatus according to claim 1, wherein the air guide surface includes at least a first air guide surface and a second air guide surface and wherein the first and the second air guide surfaces each are a flat surface or a curved surface.

8. The apparatus according to claim 1, wherein the air guide surface forms an external angle less than 45° with the adjacent surface of the battery housing.

9. The apparatus according to claim 4, wherein the vehicle height-wise bottom surface of the battery housing and/or the vehicle widthwise-side surface of the battery housing forms the air guide surface in its entirety.

10. The apparatus according to claim 2, wherein the air guide surface is provided on at least a vehicle height-wise bottom surface of the battery housing and/or a vehicle widthwise-side surface of the battery housing.

11. The apparatus according to claim 2, wherein the air guide surface includes a flat surface or a curved surface.

12. The apparatus according to claim 2, wherein the battery housing has the air guide surface in a vehicle-longitudinal rear end portion.

13. The apparatus according to claim 2, wherein the air guide surface includes at least a first air guide surface and a second air guide surface and wherein the first and the second air guide surfaces each are a flat surface or a curved surface.

14. The apparatus according to claim 2, wherein the air guide surface forms an external angle less than 45° with the adjacent surface of the battery housing.

15. The apparatus according to claim 10, wherein the vehicle height-wise bottom surface of the battery housing and/or the vehicle widthwise-side surface of the battery housing forms the air guide surface in its entirety.

* * * * *